Patented Feb. 13, 1923.

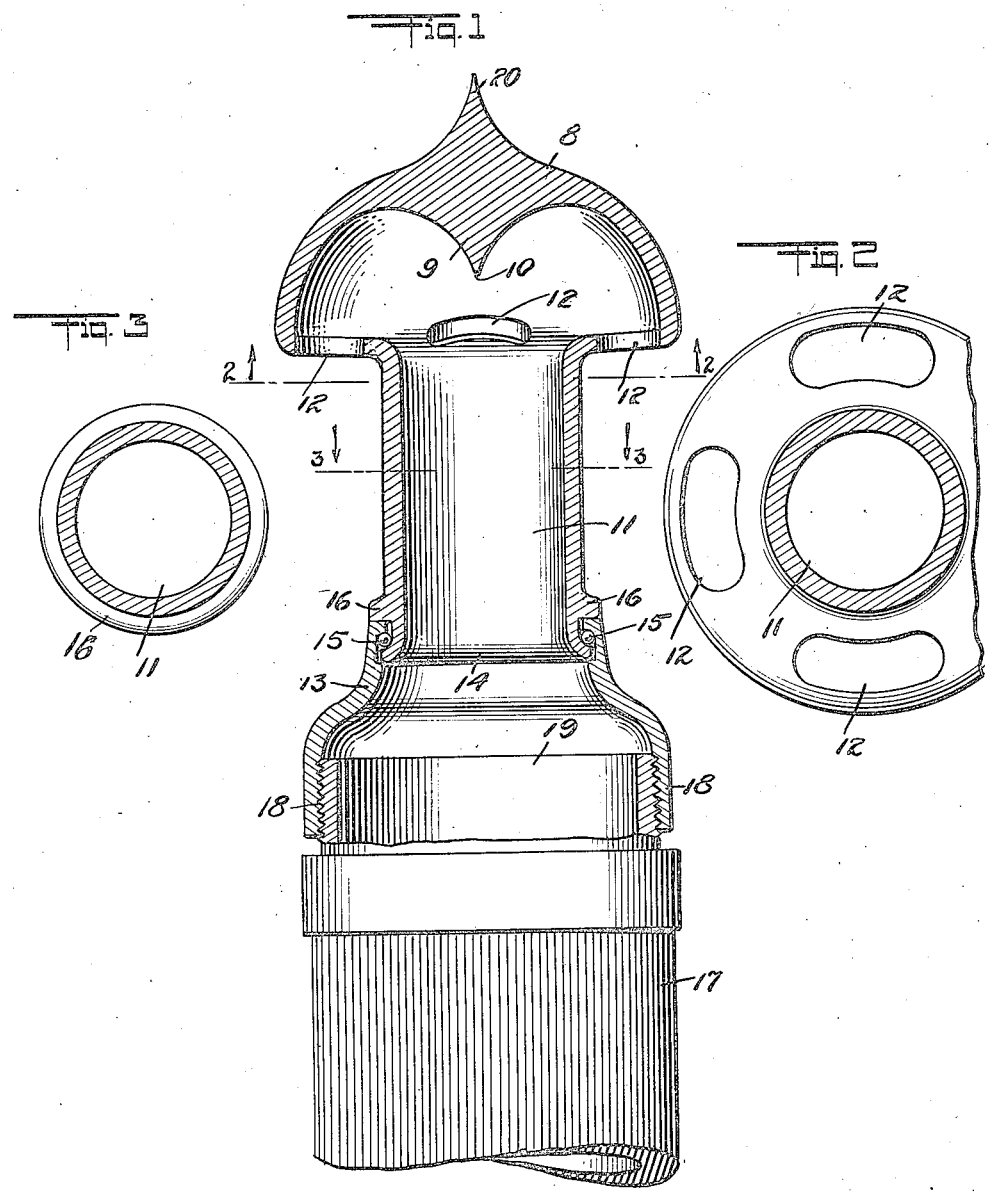

1,444,889

UNITED STATES PATENT OFFICE.

SIDNEY C. SLADDEN, OF NEW YORK, N. Y.

FLUID-PROPELLED TRACTOR.

Application filed February 14, 1921. Serial No. 444,991.

*To all whom it may concern:*

Be it known that I, SIDNEY C. SLADDEN, a citizen of the United States, and a resident of New York city, in the county and State of New York, have invented certain new and useful Improvements in a Fluid-Propelled Tractor, of which the following is a full, clear, and exact description.

Among the prinicpal objects which the present invention has in view are: to secure the full propelling power of a fluid for an apparatus such as herein disclosed; to utilize the pressure of a pipe-conveyed fluid for drawing the pipe in the direction of the fluid flow; and to simplify and cheapen the construction of the apparatus by means of which the above stated objects are attained.

Drawings:

Figure 1 is a longitudinal section of a tractor constructed and arranged in accordance with the present invention.

Figure 2 is a cross section thereof, section being taken on the line 2—2 in Figure 1.

Figure 3 is a cross section, the section being taken on the line 3—3 in Fig. 1.

The present invention more particularly consists in an improvement upon the structure disclosed in an application for patent on improvements in hose nozzles, filed April 9, 1920, having Serial Number 377,475 to which application cross reference is here made. In the present construction the forward opening nozzle disclosed in the said application is dispensed with, there being no intention in the present device to clear the passage for itself, but rather to exert all of the energy of the fluid passing through the apparatus to exert a forward thrust thereon to carry the pipe to which it is attached with greater force and speed.

In the present invention the head 8 is internally provided with a deflector 9 which presents a point 10 in line with the axis of the tubular throat 11. The inner wall of the head 8 is curved to a spiral form which leads to openings 12 at the rear of the head 8. The curvature of the inner wall of the head is so arranged that the turning influence exerted thereby on the column of fluid delivered by the throat 11 is uniform and gradual, so that without eddy or other cross-current formed in the fluid the said fluid is emitted from the said openings 12 in lines approximately parallel to the axis of the throat 11. By this means a maximum thrust of the fluid is imparted rearwardly from the head 8 against the surrounding body or medium.

As seen best in Figure 2 of the drawings the openings 12 are elongated to provide unrestricted passages for the fluid.

The head and throat are preferably formed integrally and the structure so produced is provided with a hose coupling 13, the connection between the two being preferably formed by the expanded lip 14 which forms a seat for the friction reducing balls 15. The lip 14 cooperates with annular flange 16 to hold the parts in active relation.

By reason of the joint thus formed the head 8 and throat 11 are free to turn without twisting the hose 17 to which they are connected. This permits the head to evade many obstructions in the path of its travel.

The coupler 13 has a screw threaded section 18, the threads of which correspond to the threads on the collar 19 of the hose pipe 17.

When the tractor herein described has been mounted on a pipe as indicated by the numeral 17, it may be introduced into a sewer or other conduit and water or other fluid under pressure is released to flow through the pipe 17. The pipe 17 is preferably flexible, which permits the tractor to vary its course unrestrained.

The fluid introduced through the throat 11 is diverted by the deflector 9 and delivered from the head 8 by way of the openings 12 in lines parallel with the axis of the throat 11, thereby obtaining a high factor of efficiency in utilization of the power or pressure on the fluid in the pipe 17.

In utilizing the tractor instrumentalities other than itself may be conveyed to a point of application otherwise inaccessible to said instrumentality. The tractor may also be utilized for conveying through a pipe or sinuous conduit a flexible tube, cable, or other instrument.

The spear end 20 with which the head 8 is provided has for its object merely to diminish the resistance to the forward movement of the tractor.

Claims:

1. An apparatus as characterized comprising a head having a hollow chamber and a rearwardly faced wall embodying delivery openings therein, the inner surface of said chamber being radially curved from the center thereof to said delivery openings, 2. An apparatus as characterized comprising a head having a hollow chamber and a rearwardly faced wall embodying delivery openings therein, the inner surface of said chamber being radially curved from the axis thereof to said delivery openings, said curvature being imparted to said wall by an inverted conical member, the apex whereof coincides with said axis.

3. An apparatus as characterized comprising a head embodying a hollow chamber, and a rearwardly extended tubular neck for delivering fluid to said chamber; and an unbroken front wall having an inwardly extended conical projection, the apex whereof coincides with the axis of said neck, and a series of rearwardly opening apertures for delivering the contents of said chamber in paths approximately parallel to said neck.

4. An apparatus as characterized comprising a head embodying a hollow chamber, and a rearwardly extended tubular neck for delivering fluid to said chamber; and an unbroken front wall having an inwardly extended conical projection, the apex whereof coincides with the axis of said neck, and a series of rearwardly opening apertures for delivering the contents of said chamber in paths approximately parallel to said neck; and means for rotatively mounting said head on a supply pipe.

5. An apparatus as characterized comprising a head embodying a hollow chamber, and a rearwardly extended tubular neck for delivering fluid to said chamber; and an unbroken front wall having an inwardly extended conical projection, the apex whereof coincides with the axis of said neck, and a series of rearwardly opening apertures for delivering the contents of said chamber in paths approximately parallel to said neck; and means for rotatively mounting said head on a supply pipe, said means embodying a coupling member permanently and rotatively connected with said neck.

6. An apparatus as characterized comprising a head embodying a hollow chamber, and a rearwardly extended tubular neck for delivering fluid to said chamber; and an unbroken front wall having an inwardly extended conical projection, the apex whereof coincides with the axis of said neck, and a series of rearwardly opening apertures for delivering the contents of said chamber in paths approximately parallel to said neck; and means for rotatively mounting said head on a supply pipe, said means embodying a coupling permanently united with said neck by means of a friction reducing bearing interposed between said neck and said coupling.

SIDNEY C. SLADDEN.